(12) United States Patent
Yeh

(10) Patent No.: US 8,188,644 B2
(45) Date of Patent: May 29, 2012

(54) NANOSTRUCTURED COMPOSITE ELECTRODE

(75) Inventor: Kwang Jeff Yeh, Davis, CA (US)

(73) Assignee: Mytitek, Inc., Davis, CA (US)

( * ) Notice: Subject to any disclaimer, the term of this patent is extended or adjusted under 35 U.S.C. 154(b) by 25 days.

(21) Appl. No.: 12/941,919

(22) Filed: Nov. 8, 2010

(65) Prior Publication Data

US 2011/0059333 A1    Mar. 10, 2011

Related U.S. Application Data

(63) Continuation of application No. 11/484,083, filed on Jul. 10, 2006, now Pat. No. 7,828,619.

(60) Provisional application No. 60/706,059, filed on Aug. 5, 2005.

(51) Int. Cl.
 *H01J 1/02* (2006.01)
 *H01J 9/04* (2006.01)
 *H01J 1/62* (2006.01)

(52) U.S. Cl. .................. 313/309; 313/355; 313/351

(58) Field of Classification Search .......... 313/495–497, 313/309, 336, 351, 355; 445/49–51
See application file for complete search history.

(56) References Cited

U.S. PATENT DOCUMENTS

| 6,395,427 B1 | 5/2002 | Sheem et al. |
| 6,616,875 B2 | 9/2003 | Lee et al. |
| 6,703,163 B2 | 3/2004 | Ogura et al. |
| 7,252,749 B2 | 8/2007 | Zhou et al. |
| 2006/0217025 A1 | 9/2006 | Hsiao et al. |

FOREIGN PATENT DOCUMENTS

TW    I280991    5/2007

*Primary Examiner* — Joseph L Williams
(74) *Attorney, Agent, or Firm* — Patrick J. S. Inouye

(57) ABSTRACT

A nanostructured composite electrode is provided that includes a pair of conductive metal foils and a multiplicity of ordered nanostructures formed on each conductive metal foil. The ordered nanostructures include functionalized carbon multi-walled nanotubes electrophoretically deposited onto the metal foils. The ordered nanostructures also include synthesized nanoparticles electrophoretically deposited onto each of the carbon multi-walled nanotubes and the metal foils in proportion to the concentration of the carbon multi-walled nanotubes while in a stable colloidal suspension with the synthesized nanoparticles during electrophoretic deposition.

18 Claims, 3 Drawing Sheets

30

40

NANOSTRUCTURED COMPOSITE ELECTRODE

CROSS-REFERENCE TO RELATED APPLICATION

This patent application is a continuation of U.S. patent application Ser. No. 11/484,083, filed Jul. 10, 2006, now U.S. Pat. No. 7,828,619, which claims priority from U.S. Provisional Patent Application Ser. No. 60/706,059, filed Aug. 5, 2005, expired, the priority filing dates of which are claimed, and the disclosures of which are incorporated by reference.

FIELD

The invention relates in general to nanostructured composite electrode preparation and, in particular, to a method for preparing a nanostructured composite electrode through electrochemical deposition techniques, such as electrophoretic deposition (EPD), electrolytic deposition (ELD), and electroplating, and a product prepared thereby.

BACKGROUND

Electrochemical energy storage or generation devices include batteries, capacitors and ultracapacitors, and fuel cells. Batteries are characterized by rated capacity measured by ampere-hours that can be delivered. Capacitors and ultracapacitors are characterized by the energy or power density that can be delivered in a single discharge, which is the ratio of cell energy or power to weight or volume.

All energy storage or generation devices include a pair of electrodes and an electrolyte that is disposed between the electrodes to conduct an electric current. Electrodes are electrical conductors at the surface of which a change occurs from conduction by electrons to conduction by ions. A cathode electrode contains an active material that is reduced during discharge, whereas an anode electrode contains an active material that is oxidized during discharge. Conventional electrodes, particularly cathodes, are characterized by low electrical conductivity, dependent upon the type of device and materials used. For instance, transition metal-based lithium oxide electrodes for lithium-ion batteries and amorphous transition metal-based oxide electrodes for ultracapacitors both suffer from low cathode conductivity.

To compensate for low electrode conductivity, conductive fillers, such as carbon, are frequently added to the matrix to improve the conductivity. The requirement for and the amount of carbon filler can depend on the specific oxide used and the volume of filler can be as high as forty to fifty percent of the overall cathode mixture, dependent upon relative carbon density and other cathode components. Carbon fillers also require a binder, which can further reduce the conductivity and thus decrease the specific energy of the storage device.

As the filler concentration increases, the carbon particles can clump and aggregate and uniform dispersion becomes problematic. Non-uniform dispersion can compromise both electrode performance and lifetime by decreasing the percentage of contact surface area exposed to the electrolyte. As a result, existing approaches to improving energy storage device performance generally focus on electrode construction.

U.S. Pat. No. 6,616,875 to Lee et al., issued Sep. 9, 2003, discloses a manufacturing method for a metal oxide electrode for an ultracapacitor. An amorphous manganese oxide electrode is formed by absorbing potassium permanganate onto a conductive material, such as carbon or activated carbon, and is mixed with a solution to form amorphous manganese oxide. Conductive carbon is used as the active material and requires a binder to compensate for the low electrical conductivity of the manganese oxide.

U.S. Pat. No. 6,703,163 to Ogura et al., issued Mar. 9, 2004, discloses a lithium battery and electrode. A plurality of carbon nanotubes are dispersed in a conductive matrix containing an electrically conductive polymer and an organic compound having a disulfide group that is responsible for electrochemical reactions at the electrode. The carbon nanotubes conduct electricity along an axial direction of the matrix to decrease electrical resistance and improve conductivity over the electrically conductive polymer. However, the carbon nanotubes also function as a filler and require a binder.

U.S. Pat. No. 6,395,427 to Sheme et al., issued May 28, 2002, discloses a negative active material for and a method of preparing a rechargeable lithium battery. The negative active material includes a crystalline carbon core and a semi-crystalline carbon shell. Amorphous or crystalline carbon is mixed into a catalyst element and agglomerated to form carbon core particles that can provide micro-porous channels to improved electrolyte immersion. However, the carbon core particles function as a filler and can suffer from non-uniform diffusion.

Accordingly, there is a need for preparing and providing an energy storage device electrode with increased electrical conductivity and improved power density without relying on carbon with a binder in the matrix.

SUMMARY

A composite electrode includes nanosized particles that are assembled on the surface of carbon nanotubes through electrochemical techniques that include electrophoretic deposition (EPD), electrolytic deposition (ELD), and direct deposition. The resulting electrode features ordered structure with high porosity, which improves energy storage or generation device performance by enabling faster and uniform diffusion and improved reaction routes via the carbon nanotubes. The electrode can be used for lithium-ion batteries, ultracapacitors and fuel cells, as well as other energy storage or generation devices.

One embodiment provides a nanostructured composite electrode that includes a pair of conductive metal foils and a multiplicity of ordered nanostructures formed on each conductive metal foil. The ordered nanostructures include functionalized carbon multi-walled nanotubes electrophoretically deposited onto the metal foils. The ordered nanostructures also include synthesized nanoparticles electrophoretically deposited onto each of the carbon multi-walled nanotubes and the metal foils in proportion to the concentration of the carbon multi-walled nanotubes while in a stable colloidal suspension with the synthesized nanoparticles during electrophoretic deposition.

A further embodiment provides a nanostructured composite electrode that includes a pair of conductive metal foils and a multiplicity of ordered nanostructures formed on each conductive metal foil. The ordered nanostructures include functionalized carbon multi-walled nanotubes electrophoretically deposited onto the metal foils. The ordered nanostructures also include synthesized nanoparticles electrophoretically deposited onto each of the carbon multi-walled nanotubes and the metal foils in proportion to the concentration of the carbon multi-walled nanotubes while in a stable colloidal suspension with the synthesized nanoparticles during electrophoretic deposition. The synthesized nanoparticles include an alkali metal and a transition metal that have been dissolved in a citrate acid solution, combusted and annealed prior to the electrophoretic deposition.

A still further embodiment provides a nanostructured composite electrode that includes a pair of conductive metal foils and a multiplicity of ordered nanostructures formed on each conductive metal foil. The ordered nanostructures include functionalized carbon multi-walled nanotubes directly deposited onto the metal foils. The ordered nanostructures also include synthesized nanoparticles directly deposited onto the metal foils while in a stable colloidal suspension with the nanoparticles in manganese salt-containing solvent. The ordered nanostructures are annealed onto the metal foils without a binder following direct deposition.

A still further embodiment provides a nanostructured composite electrode that includes a pair of conductive metal foils and a multiplicity of ordered nanostructures formed on each conductive metal foil. The ordered nanostructures include functionalized carbon multi-walled nanotubes electrophoretically deposited onto the metal foils while in a stable colloidal suspension with synthesized nanoparticles. The ordered nanostructures are annealed onto the metal foils without a binder following electrophoretic deposition.

The nanoparticles in the composite electrodes are deposited on the nanotubes to form an ordered nanostructure, which provides an effective conduction network. Additionally, highly conductive nanotubes with high aspect ratios can be used as conducting additives to form efficient conductive paths, even in low volume, to enable fast charge and discharge with low capacity loss. Similarly, the high aspect ratio and entanglement of carbon nanotubes significantly increase electrode porosity. Electrolyte ion access to the composite active mass becomes favored, while maintaining the improved electrical conductivity provided by the carbon nanotubes. Thus, battery electrode capacity and capacitor or ultracapacitor electrode capacitance are significantly improved.

Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

DETAILED DESCRIPTION

Carbon nanotubes (CNTs) are characterized by high electrical conductivity, chemical stability, low mass density, and large surface area. CNTs typically have aspect ratios greater than 1000 and require a lower percolation threshold when used as conductive fillers. Only a relatively low volume fraction of CNTs in the electrode are needed to form an effective conductive path network to enable faster charge and discharge with low capacity loss. Battery rate capacity and capacitor power density can thus be improved.

Figure 1:
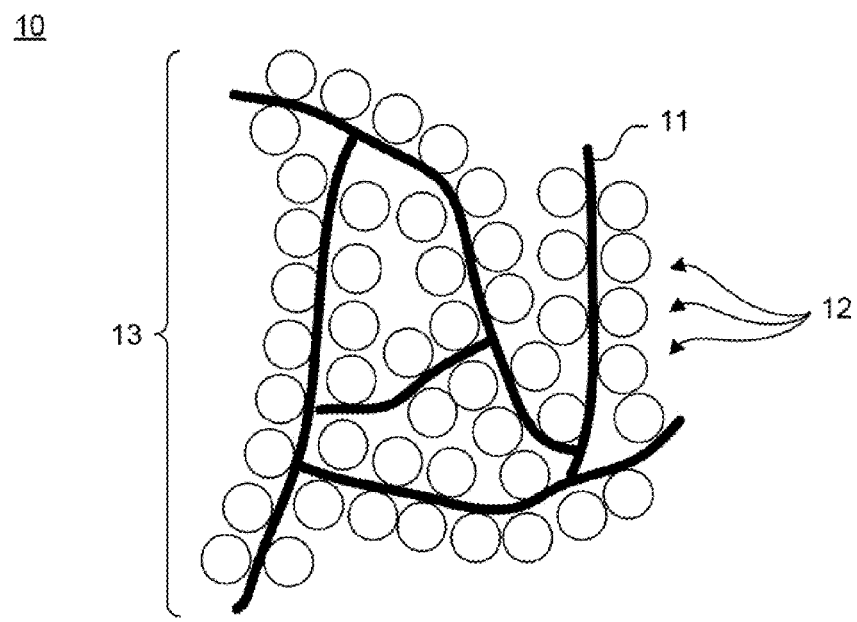
FIG. 1 is a functional diagram showing, by way of example, a conductive path network formed by entangled nanotubes and attracted nanoparticles.

FIG. 1 is a functional diagram 10 showing, by way of example, a conductive path network 13 formed by entangled nanotubes 11 and attracted nanoparticles 12. For clarity, the relative sizes and placements of the nanotubes 11 and nanoparticles 12 are exaggerated. Forming a composite electrode with high specific surface area CNTs significantly increases the electrode porosity due to a high aspect ratio and the entanglement of CNTs. Ions accessibility from the electrolyte to the active mass of the composite is favorable due to the open electrode network and electrical conductivity provided by the CNTs. In a composite electrode with an ordered structure, the nanoparticles attach to the surfaces of the CNTs. Thus, the function of nanotubes as conductors is fully exerted and highly effective conducting paths are obtained. As a consequence, electrode capacity for capacitors and batteries and electrode capacitance for capacitors and ultracapacitors is significantly improved. Finally, the film formed using this technique provides flexibility and entanglement of CNTs ensure good composite electrode mechanical properties.

In one embodiment, a highly conductive multi-walled carbon nanotube (MWNTs) electrode is prepared via EPD to form a thin film electrode on a conductive metal foil, for example, nickel, aluminum, or copper foil, which can be used as a current collector. This electrode can be used as an electrode in battery, ultracapacitor, or fuel cell applications. This thin film electrode can also be used as the base electrode in state of the art batteries to enhance performance.

In one embodiment, a composite electrode is prepared that includes highly conductive multi-walled carbon nanotubes (MWNTs) as conductive filler and nanosized particles as an active element. The nanosized particles are assembled on the surfaces of the nanotubes via EPD, ELD, or direct deposition to form a thin film composite electrode on a conductive metal foil, for example, nickel, aluminum, or copper foil, which can be used as a current collector. The nanoparticles can be composed of $LiCoO_2$, $LiMnO_2$, $LiNiO_2$, $Li_xMn_{1-y}Ni_yO_2$ for lithium-ion batteries; amorphous $MnO_2$ or $RuO_2$ for ultracapacitors; and Pt or Ru for fuel cells.

Figure 2:
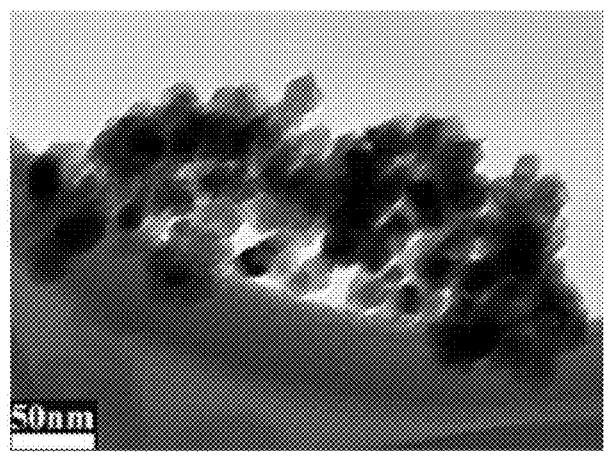
FIG. 2 is a TEM image showing nanoparticles composed of $LiCoO_2$.

The nanoparticles are produced by low temperature synthesis. As an example, to synthesize $LiCoO_2$ nanoparticles, lithium nitrate and cobalt are dissolved in distilled water with citrate acid, which is used as fuel for combustion synthesis. The solution is placed on a hot plate to evaporate the water and auto-ignited to form a loose powder through combination. FIG. 2 is a TEM image 20 showing nanoparticles composed of $LiCoO_2$. The TEM image 20 is scaled to 50 nm. As shown with reference to the TEM image 20, the size of $LiCoO_2$ nanoparticles is around 20-30 nm after annealing at 500° C. for three hours. Other methods for producing nanoparticles are possible.

Example 1

Electrophoretic deposition (EPD) is a colloidal process. Raw materials are shaped directly from a stable suspension via motion of charged particles, which are dispersed in a liquid towards an electrode under a direct current electric field. CNTs and nanoparticles coagulate to form deposits on the electrode.

In one embodiment, charged CNTs and nanoparticles are separated in solution from sediment through upward deposition. Two conductive metal foils, for example, copper foils, are introduced into the stable suspension in parallel orientation with one of the metal foils preferably superposed above the other metal foil. The metal foils are connected to a direct current power source and used as EPD electrodes.

Stable suspensions with varied concentrations of carbon nanotubes can be prepared. To prepare the stable suspension, a predetermined amount of refluxed functionalized CNTs, such as $LiCoO_2$ nanoparticles, and an electrolyte, such as $Mg(NO_3)_2$ or equivalent nitrates, are placed in a beaker containing ethanol as a solvent. The solution is sonicated for about 30 minutes. In a typical experiment, 15 mg of functionalized MWNTs are dispersed in 200 ml of ethanol by ultrasonication. To create a surface charge on the MWNTs, $10^{-5} \sim 10^{-4}$ mol of $Mg(NO_3)_2$ is added into the stable suspension as an electrolyte. Once the stable suspension is available, a direct current of approximately 20-45 Volts is applied to the electrodes. The optimum current is approximately 60-80 mAmps.

Figure 3:
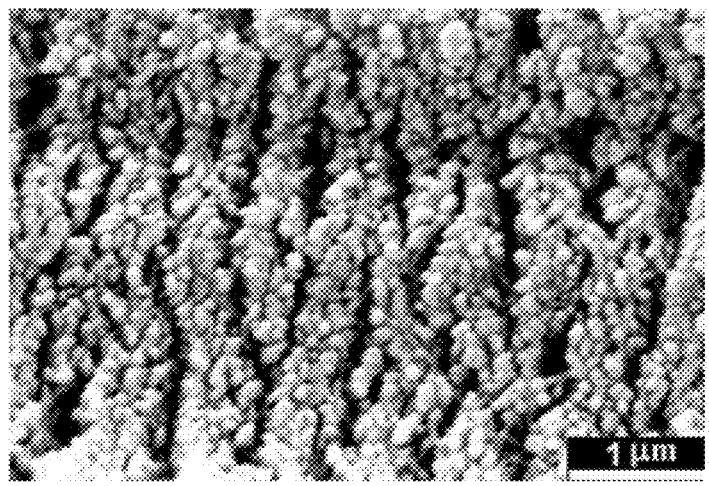
FIGS. 3 and 4 are TEM images showing the nanostructures of the composite electrodes prepared through EPD or ELD.
Figure 4:
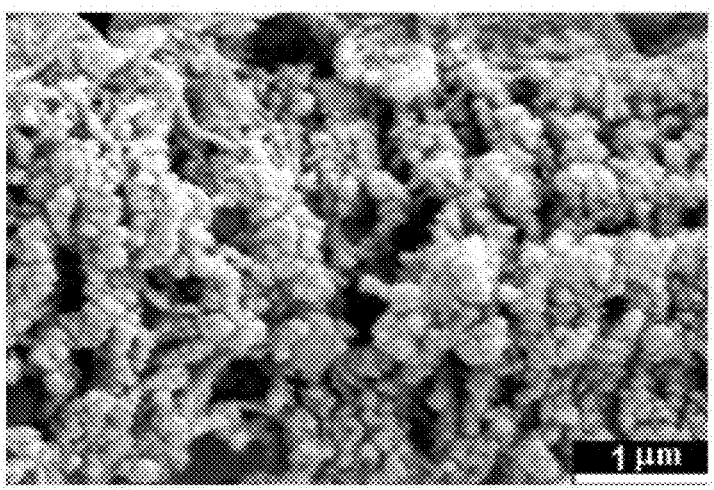

FIGS. 3 and 4 are TEM images 30, 40 showing the nanostructures of the composite electrodes prepared through EPD. The TEM image 40 is scaled to 1.0 µm. Both TEM images 30, 40 show composite cathode films composed of MWNTs and $LiCoO_2$ nanoparticles respectively in the $LiCoO_2$/MWNTs composite 15 wt % and 10 wt % concentrations. When the fraction of MWNTs in the composite electrode is appropriately 15 wt %, the MWNTs tend to serve as a template for assembling the nanoparticles and an ordered structure can be obtained. However, when the fraction of MWNTs in the composite electrode is approximately 10 wt %, the ordered degree decreases. Ordered structures tend to form in samples with higher concentrations of CNTs due to more available surfaces upon which nanoparticles can attach. Furthermore, CNTs migrate faster than nanoparticles during EPD and serve as nanoelectrodes for depositing nanoparticles onto the EPD electrodes. When the concentration of CNTs in the stable suspension is lower, the nanoparticles tend to deposit directly onto the EPD electrodes to form a film upon which CNTs and nanoparticles mix together in a regular way.

Example 2

Electrolyte deposition (ELD) also is a colloidal process that forms thin films from solutions of metal salts in electrode reactions. In one embodiment, to prepare an amorphous $MnO_2$ (a-$MnO_2$) composite electrode, functionalized MWNTs are suspended in manganese salt-containing solvent. The presence of functional groups on the walls of the functionalized MWNTs allows $Mn_2+$ ions to be easily absorbed. In a typical experiment, a colloidal suspension of MWNTs in DMF at a concentration of 5 mg/ml is prepared and about 30 mg of $Mn(NO_3)_2 \cdot 6H_2O$ is added. For electrochemical measurement, a 1M $Na_2SO_4$ aqueous solution is used as the electrolyte. The suspension is sonicated for about 30 minutes. The composite electrodes are prepared by directly depositing 0.10 ml of the colloidal suspension on nickel foils and dried at room temperature. After drying, the electrodes are heated to 250° C. in a furnace at a heating rate of 5° C./min and held at 250° C. for about 30 minutes. During the heating process, $Mn(NO_3)_2$ is released as a gas and amorphous $MnO_2$ results.

Figure 5A:
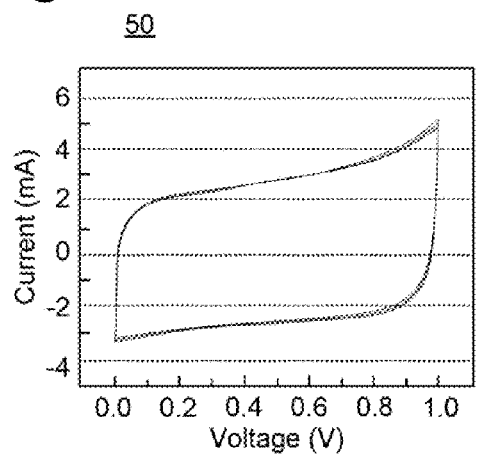
FIGS. 5A-B are graphs showing cyclic voltammograms of composite electrodes.
Figure 5B:
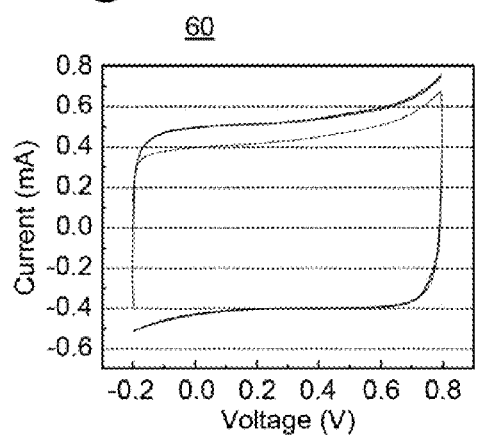

FIGS. 5A-B are graphs showing cyclic voltammograms 50, 60 of composite electrodes. The x-axis represents voltage. The y-axis represents current in milliamps (mAmps). The cyclic voltammograms 50, 60 are captured at a scan rate of 50 mV/s for the ultracapacitors. Referring first to FIG. 5A, an ultracapacitor with a composite electrode composed of $MnO_2$ is shown. The active material in the composite electrode is about 1.4 mg, including about 0.5 mg of CNTs and about 0.9 mg of $MnO_2$ nanotubes. Referring next to FIG. 5B, an ultracapacitor with an electrode composed of pure CNTs is shown. The active material in the electrode is about 0.5 mg of CNTs. The current produced by the composite electrode ultracapacitor is significantly larger than the current produced by the pure CNTs electrode ultracapacitors. The capacitance of the composite electrode ultracapacitor, about 46 F/g, is approximately twice the capacitance of the pure CNTs electrode ultracapacitor, about 20 F/g.

Figure 6A:
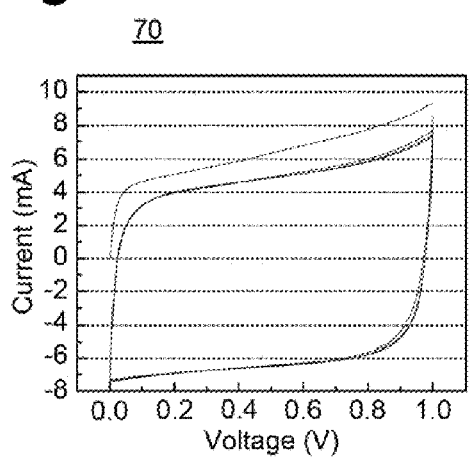
FIGS. 6A-B are graphs showing cyclic voltammograms for ultracapacitors.
Figure 6B:
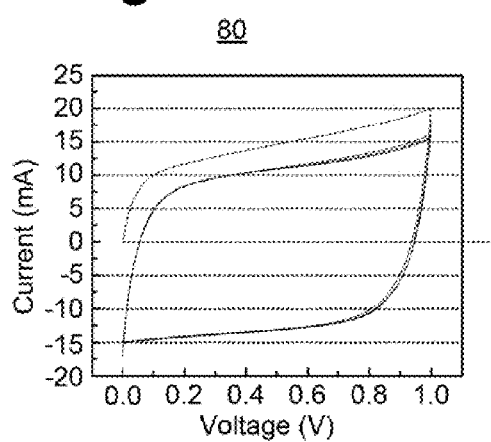

FIGS. 6A-B are graphs showing cyclic voltammograms 70, 80 for ultracapacitors. The cyclic voltammograms 70, 80 were respectively captured at scan rates of 100 mV/s and 250 mV/s for ultracapacitors with composite electrodes composed of $MnO_2$. The CV shapes of both ultracapacitors are still close to a rectangular shape, even when captured at a high scan rate and a maximum power density of about 20-25 kW/kg can be obtained.

Figure 7:
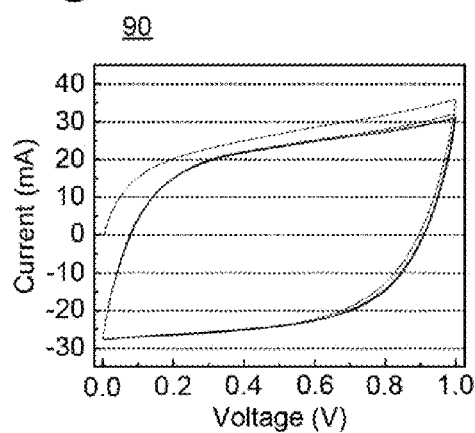
FIGS. 7 and 8 are graphs showing cyclic voltammograms of a composite electrode.
Figure 8:
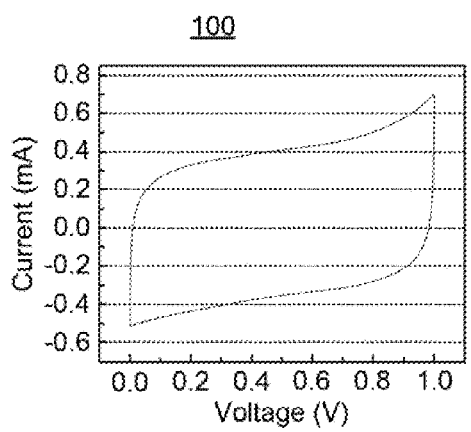

Finally, FIGS. 7 and 8 are graphs showing cyclic voltammograms 90, 100 of a composite electrode. The cyclic voltammograms 90, 100 were respectively captured at scan rates of 500 Mv/s and 5 Mv/s for an ultracapacitor with composite electrodes composed of $MnO_2$. A capacitance of about 70 F/g can be obtained if calculated at a lower scan rate, such as shown with reference to FIG. 8.

Example 3

Composite electrodes composed of a-$MnO_2$ for ultracapacitors can also be prepared via combined EPD and ELD. Functionalized MWNTs are negatively charged and can be easily charged with cations when added into a solution of metal salt. In a typical experiment, 4.5 mg of functionalized MWNTs are dispersed in 60 ml of ethanol by ultrasonication and 10 mg of $Mn(NO_3)_2$ are added into the suspension as an electrolyte.

Empirically, the resultant film formed by MWNT deposition on the electrodes exhibits strong adhesion and no binder is necessary. Since the MWNTs in the bottommost deposit layer is in direct electrical contact with the electrode current collector, direct electrical paths from the electrode materials to the current collector are available and contact resistance, as well as internal resistance, is minimal.

Further Embodiments

In addition to electrode conductors composed of pure MWNTs, in a further embodiment, a mixture of carbon nanotubes and carbon black particles could be engaged by varying the volume percent of carbon nanotubes.

In addition, in a still further embodiment, water or other organic solvent, can be used to prepare the suspension of carbon nanotubes rather than ethanol.

In addition, in a still further embodiment, other nitrates can be used as an electrolyte to charge nanoparticles and nanotubes during EPD rather than $Mg(NO_3)_2$.

Moreover, the active sites for Faradic reactions can be extended to areas around the contact points in composite electrodes. Electrons flow from the contact point between the MWNTs and the surface of the active nanoparticles to take part in a Faradic reaction. Therefore, larger capacitance for ultracapacitors or energy or power capacity for lithium-ion batteries can be obtained from composite electrodes.

Similarly, the composite electrodes formed by colloidal techniques, such as EPD, ELD, or direct deposition, exhibit strong adhesion to the electrode, for instance, when used as a capacitor current collector, and no binder is necessary. Since the MWNTs in the bottommost deposit layer of the MWNT and nanoparticle film is directly connected to the current collector, contact resistance and internal resistance are minimal, resulting in improved capacitor power density and lithium-ion battery rate capability.

While the invention has been particularly shown and described as referenced to the embodiments thereof, those skilled in the art will understand that the foregoing and other changes in form and detail may be made therein without departing from the spirit and scope of the invention.

What is claimed is:

1. A nanostructured composite electrode, comprising:
   a pair of conductive metal foils; and
   a multiplicity of ordered nanostructures formed on each conductive metal foil, comprising:
      functionalized carbon multi-walled nanotubes electrophoretically deposited onto the metal foils; and
      synthesized nanoparticles electrophoretically deposited onto each of the carbon multi-walled nanotubes and the metal foils in proportion to the concentration of the carbon multi-walled nanotubes while in a stable colloidal suspension with the synthesized nanoparticles during electrophoretic deposition.

2. A nanostructured composite electrode according to claim 1, wherein the proportion of the carbon multi-walled nanotubes comprises between 10 wt % and 15 wt %.

3. A nanostructured composite electrode according to claim 1, further comprising:
   nanoelectrodes comprising synthesized nanoparticles electrophoretically deposited onto the carbon multi-walled nanotubes,
   wherein the nanoelectrodes are electrophoretically deposited onto the metal foils.

4. A nanostructured composite electrode according to claim 1, wherein the synthesized nanoparticles comprise a compound selected from the group comprising $Mg(NO_3)_2$ of between $10^{-5}$ and $10^{-4}$ mol.

5. A nanostructured composite electrode according to claim 1, wherein the conductive metal foils are selected from the group comprising nickel, aluminum, or copper.

6. A nanostructured composite electrode, comprising:
   a pair of conductive metal foils; and
   a multiplicity of ordered nanostructures formed on each conductive metal foil, comprising:
      functionalized carbon multi-walled nanotubes electrophoretically deposited onto the metal foils; and
      synthesized nanoparticles electrophoretically deposited onto each of the carbon multi-walled nanotubes and the metal foils in proportion to the concentration of the carbon multi-walled nanotubes while in a stable colloidal suspension with the synthesized nanoparticles during electrophoretic deposition, the synthesized nanoparticles comprising an alkali metal and a transition metal that have been dissolved in a citrate acid solution, combusted and annealed prior to the electrophoretic deposition.

7. A nanostructured composite electrode according to claim 6, wherein the proportion of the carbon multi-walled nanotubes comprises between 10 wt % and 15 wt %.

8. A nanostructured composite electrode according to claim 6, further comprising:
   nanoelectrodes comprising synthesized nanoparticles electrophoretically deposited onto the carbon multi-walled nanotubes,
   wherein the nanoelectrodes are electrophoretically deposited onto the metal foils.

9. A nanostructured composite electrode according to claim 6, wherein the synthesized nanoparticles comprise a compound selected from the group comprising $LiCoO_2$, $LiMnO_2$, $LiNiO_2$, and $Li_xMn_{1-y}Ni_yO_2$.

10. A nanostructured composite electrode according to claim 6, wherein the synthesized nanoparticles comprise a compound selected from the group comprising manganese dioxide and ruthenium dioxide or from the group comprising platinum and ruthenium.

11. A nanostructured composite electrode, comprising:
    a pair of conductive metal foils; and
    a multiplicity of ordered nanostructures formed on each conductive metal foil, comprising:
       functionalized carbon multi-walled nanotubes directly deposited onto the metal foils; and
       synthesized nanoparticles directly deposited onto the metal foils while in a stable colloidal suspension with the nanoparticles in manganese salt-containing solvent,
    wherein the ordered nanostructures are annealed onto the metal foils without a binder following direct deposition.

12. A nanostructured composite electrode according to claim 11, wherein the synthesized nanoparticles comprise a compound selected from the group comprising $Mn(NO_3)_2 \cdot 6H_2O$.

13. A nanostructured composite electrode according to claim 11, wherein the synthesized nanoparticles comprise a compound selected from the group comprising amorphous $MnO_2$.

14. A nanostructured composite electrode, comprising:
    a pair of conductive metal foils; and
    a multiplicity of ordered nanostructures formed on each conductive metal foil, comprising:
       functionalized carbon multi-walled nanotubes electrophoretically deposited onto the metal foils while in a stable colloidal suspension with synthesized nanoparticles,
    wherein the ordered nanostructures are annealed onto the metal foils without a binder following electrophoretic deposition.

15. A nanostructured composite electrode according to claim 14, wherein the fraction of the carbon multi-walled nanotubes comprises between 10 wt % and 15 wt %.

16. A nanostructured composite electrode according to claim 14, wherein the synthesized nanoparticles comprise a compound selected from the group comprising $Mn(NO_3)_2$.

17. A nanostructured composite electrode according to claim 14, wherein the synthesized nanoparticles comprise a compound selected from the group comprising amorphous $MnO_2$.

18. A nanostructured composite electrode according to claim 14, wherein the conductive metal foils are selected from the group comprising nickel, aluminum, or copper.

* * * * *